United States Patent [19]

Sie

[11] Patent Number: 4,694,162
[45] Date of Patent: Sep. 15, 1987

[54] SIGN BIT OPTICAL-ELECTRICAL GEOPHONE

[75] Inventor: Swan A. Sie, Placentia, Calif.

[73] Assignee: Chevron Research Company, San Francisco, Calif.

[21] Appl. No.: 560,017

[22] Filed: Dec. 9, 1983

[51] Int. Cl.⁴ ............................................. G01D 5/34
[52] U.S. Cl. ................................... 250/231 R; 73/653
[58] Field of Search ............... 250/231 R, 227; 181/108–112; 73/653; 455/610, 612, 614

[56] References Cited

U.S. PATENT DOCUMENTS

| | | | |
|---|---|---|---|
| 3,851,167 | 11/1974 | Levine | 455/610 |
| 4,321,464 | 3/1982 | Miller | 250/231 R |
| 4,353,259 | 10/1982 | Schneider | 73/653 |
| 4,359,637 | 11/1982 | Perren | 250/231 R |
| 4,376,390 | 3/1983 | Rines | 73/653 |
| 4,403,144 | 9/1983 | Strahan et al. | 250/231 R |
| 4,517,456 | 5/1985 | Halsall et al. | 250/227 |

Primary Examiner—David C. Nelms
Attorney, Agent, or Firm—E. J. Keeling; A. Stephen Zavell; V. A. Norviel

[57] ABSTRACT

An optical-electrical geophone which generates a binary signal is described. The geophone utilizes an optical fiber for the return transmission of a light source in the geophone. The geophone contains a light chopping means which oscillates in response to vibrations imparted into a geologic formation. As the chopping means such as a baffle or a tubular member vibrates, it chops the light signal and creates an on/off light pattern, i.e., binary signal. The light passing through a slit in the baffle or tubular member is returned to the seismic vehicle through an optical fiber for further processing. The optical-electrical geophone creates a binary signal directly without the use of clipping electronics and magnets or coils used in conventional geophones.

15 Claims, 5 Drawing Figures

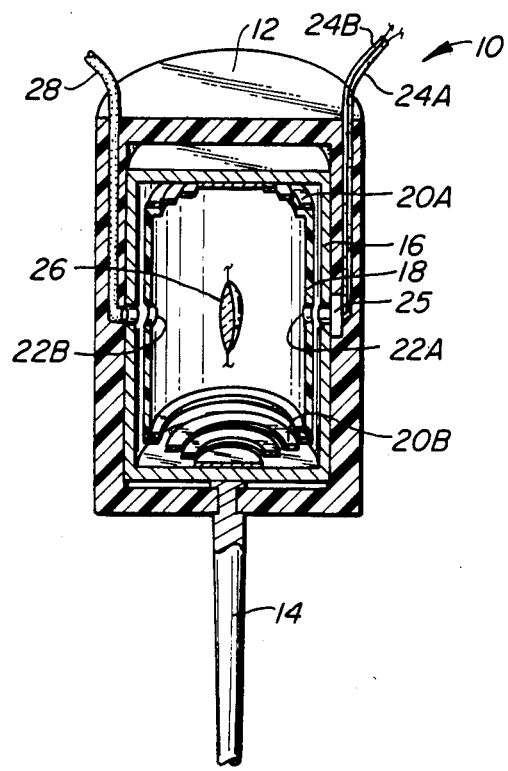
FIG._1.
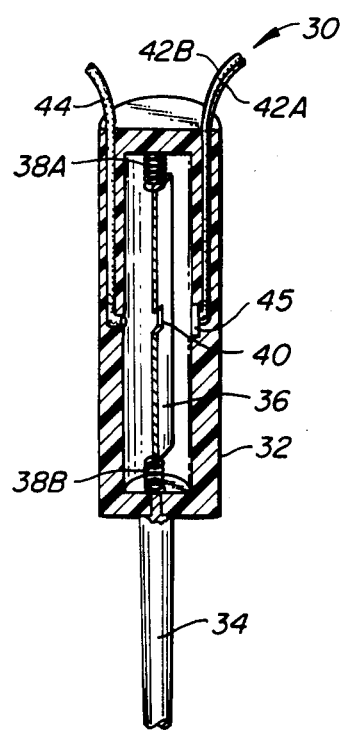
FIG._2.
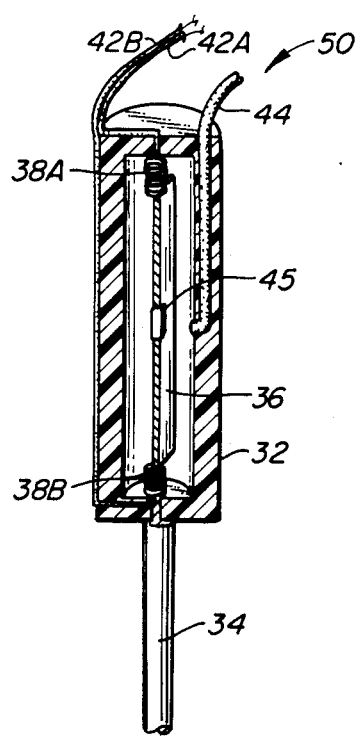
FIG._3.

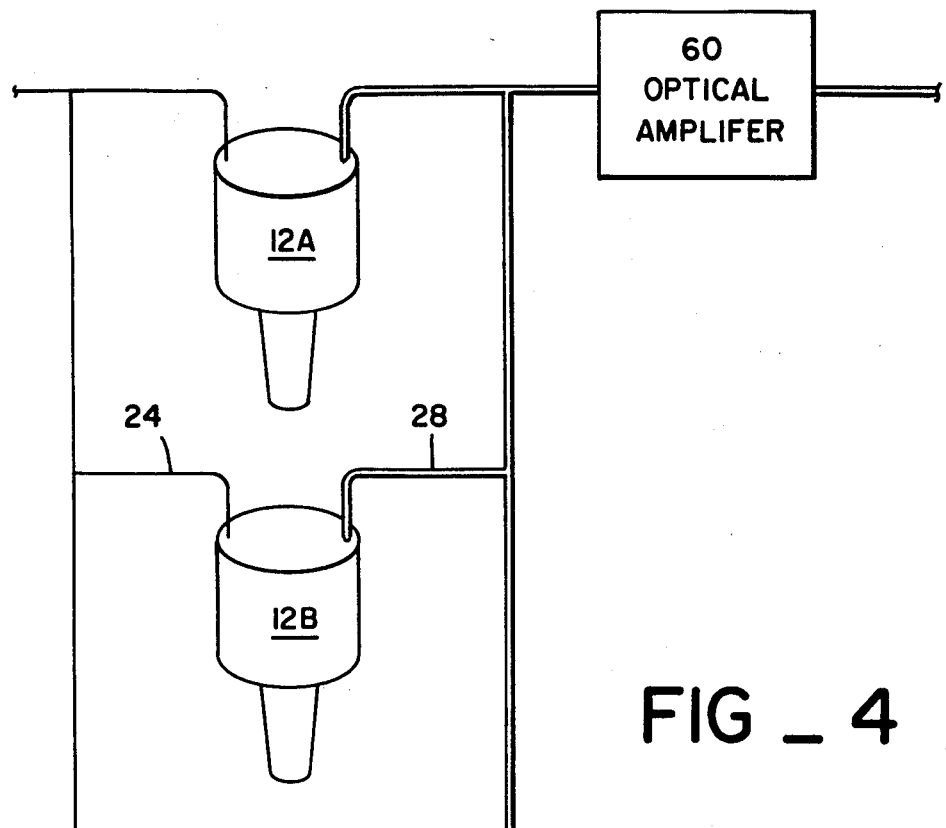
FIG _ 4
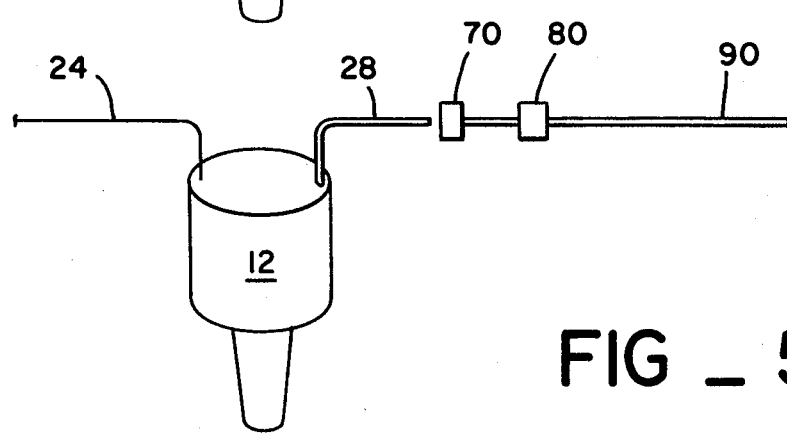
FIG _ 5

SIGN BIT OPTICAL-ELECTRICAL GEOPHONE

This invention relates to geophones. More specifically, this invention relates to optical-electrical geophones.

BACKGROUND OF THE INVENTION

Conventional geophones employ permanent electric coils suspended and dampened by springs or other means such as air, oil, and the like. The geophone is connected to a pair of wires. Thereafter, an explosion or other geologic moving event is created. The vibrations are picked up by the geophone which causes the coil to move. The movement of the coil in the magnetic field induces a change in voltage which is detected and recorded back at the seismic truck. If the voltage changes are desired in binary form, suitable processing electronics clip the voltage spikes to produce a binary signal. The accuracy of this signal is determined by the stability of the clipping electronics.

When conventional geophones are operated near sources of alternating currents such as high-tension lines, or other sources which produce or use alternating currents, the signals are effected in the 50 Hz to 60 Hz range by the stray electrical sources. Isolation of the geophones from these sources improves results but it is still impossible to eliminate their effect.

Therefore, it would be highly desirable to have a geophone which is not affected by voltage transmission interferences. It would also be desirable to have a geophone which initially produces a binary signal which does not require the use of magnets, coils and clipping electronics.

SUMMARY OF THE INVENTION

I have invented a geophone which generates a sign bit signal in response to geologic movement. Sign bit or binary signal is defined as a signal which is either on or off. More specifically, the geophone produces a binary signal in response to geological movement. The binary signal is created without the need of clipping electronics or the magnetics and coils found in conventional geophones. In addition, the geophone can operate in an environment containing stray electromagnetic radiation such as high-powered radio waves, or a AC power line transmissions.

The geophone operates by clipping a light signal from an LED or laser with a suitable light chopping means such as a mask or a slit in a tube or baffle. The geophone can be set up to function so that either the passage of light or the absence of light is the continuous signal. However, a continuous light signal is preferably because this permits the continuity of the system to be assured prior to the production of an explosion. The interference of the transmission of the light through an optical wave guide such as an optical fiber results in the generation of the "Off" portion of the binary signal.

Since the geophone need only be designed to create a light or no-light signal, the whole apparatus can be designed in a more compact package. This permits the seismic exploration truck to carry more geophones for more repetitive measurements. More geophones means the data base for predictions is larger and can be made with greater accuracy. In addition, the optical fibers require less space than conventional electric cables and, therefore, more cabling can be carried for a wider dispersion of geophones around a seismic station. Of course, conventional geophone packaging can be used if desired.

Other advantages of the invention will be evident from the following detailed description when read in conjunction with the accompanied drawings.

BRIEF DESCRIPTION OF THE DRAWINGS

FIG. 1 illustrates a sign-bit optical-electrical geophone in a conventional case.

FIG. 2 illustrates a slim-line sign-bit optical-electrical geophone.

FIG. 3 illustrates a slim-line sign-bit optical-electrical geophone using a single optical fiber.

FIG. 4 illustrates an embodiment of the present invention using a plurality of geophones and an optical amplifier.

FIG. 5 illustrates an embodiment of the present invention wherein the binary chopped light signal is converted into a binary electrical signal, and the binary electrical signal is converted into a second binary chopped light signal.

DETAILED DESCRIPTION OF THE INVENTION

The invention will be more clearly illustrated by referring to the drawings. FIG. 1 illustrates a sign-bit optical-electrical geophone 10 in the conventional case 12. The case 12 is attached to a long spike 14 for implanting it into the ground or any other means for coupling the geophone to the ground such as a flat pedestal, and the like. The case 12 contains an inner case 16 which houses a tubular shaped member 18 suspended within case 16 by springs 20a and 20b. The inner case 16 contains a suitable dampening medium such as air, oil, and the like. In a conventional geophone, the tubular member 18 would contain wire windings to form a coil. However, since no coil is needed in the optical-electrical geophone 10, the tube 18 is fabricated from plastic or other suitable material. The cylinder 18 contains slits 22a and 22b. The tube 18 and slits 22a and 22b function as the light chopping means. The length of the slit is designed to be at least equal to or longer than about one-half of the expected total amplitude, i.e., up and down movement of the cylinder containing the slits. The motion of the cylinder is a function of its mass and the spring strength. Furthermore, the slit is positioned so that either the up movement or the down movement passes light while a movement in the other direction passes no light. The width need only be large enough to permit enough light to pass for focusing onto a return fiber 28. The more light the stronger the signal.

Wires 24A and 24B are connected to a light generating means 25 such as an LED or Laser on the input side of the case 12 or inner case 16. The slits 22a and 22b and light source 25 are positioned, preferably, so that when the geophone is at rest, the light can shine through the slits 22a and 22b to an output fiber 28 affixed opposite side of the case 16. The tubular member 18 optionally contains a means for focusing 26 the light emitted from the light source 25 such as a suitable lensing system of a lens or lenses. This focuses the light emitted from the the light source 25 which passes through the slit 22a onto the receiving end of the fiber 28 through slit 22b. Since the optical geophone 10 does not require any coil or magnet, the parts need not be constructed of special metals. However, the springs must be constructed of materials which give a uniform response. In this embodiment, conventional geophone springs can be used.

Preferably, the geophone 10 would be constructed of light-weight durable plastics.

The geophone 10 operates by providing an electric current to power the light source such as an LED or a laser, for example, a gallium arsenide laser through wires 24a and 24b. The laser light shines through or is chopped by the slits 22a and 22b. The focusing means 26 focuses the light back into the fiber 28 which directs it towards the processing hardware. Since the sign-bit signal is an on or off light signal, it is not affected by electrical interference and thus the processing hardware has a cleaner signal to process. If optical processing is used, the signal from the fiber 28 can be processed directly. However, if conventional signal processing is used, then the light from the fiber 28 must impinge on a suitable transducer, such as a photodiode, to convert the optical signal into an electrical signal for conventional processing.

The use of light as the signal means with the chopping means to generate the binary signal permits the fabrication of slim-line optical-electrical geophones. FIG. 2 illustrates a preferred slim-line optical geophone 30. The geophone 30 contains a case 32 which incorporates a means for communicating with the ground such as a spike 34. Within the case 32 is a baffle 36 suspended by springs 38a and 38b. The baffle 36 contains a slit 40. Optionally, and not illustrated, the slit can contain a means for focusing light such as a lens to enhance the transfer of light from the light source 45 into the fiber 44. The light source 45 such as a laser or LED is powered by current from wires 42a and 42b. The fiber 44 is affixed to the case 32 such that a continuous stream of light passes through slit 40 when geophone 30 is at rest. Preferably, the case 32 is as narrow as possible to limit the loss of light outside the fiber 44. During the operation of the geophone 30, the baffle 36 moves up and down as a chopping means to chop the transfer of the light from the fibers 42 and 44. This chopping creates the binary signal. As described for the geophone 10 in FIG. 1, the light originates at the geophone and returns for processing through the optical fiber 44. Since the optical geophone 30 does not require magnet or coil, the optimum configuration would be in a thin square or rectangular configuration. As described with respect to the geophone 10, the slit 40 can be configured to generate any desired sign bit signal.

FIG. 3 refers to another alternative embodiment of the invention. A geophone 50 is illustrated which contains the light source 45 where the slit 40 was in the geophone 30. The baffle 36 is designed to provide power to the light source 45 from wires 42a and 42b through the springs 38a and 38b respectively. The light source 45 is adjusted so that light is within the angle of acceptance of the fiber 44 when the light source is at rest or in either an up movement or a down movement but not both. The angle of acceptance can be adjusted with suitable optics such as suitably positioned plano convex, double convex, coverging lenses or collimating lenses, or plastic light pipes and/or light wave guides such as illustrated in U.S. Pat. No. 4,275,950, not illustrated.

As the length of the fiber increases between the geophones and the seismic vehicle, optical amplifiers can be used in the light returning fiber to enhance the signal received at the seismic vehicle.

The system as described requires each geophone to be connected directly to the seismic vehicle. If more than one geophone is desired along the optical fiber than the emitted frequency of the light source is changed in every geophone, e.g., the first geophone includes a red LED and the second includes a yellow LED, etc. The different colors and/or frequency, i.e., near and far infrared, is injected into a single return fiber and separated out at the seismic vehicle by passing through a prism and then onto suitable photodiodes or with charge coupled devices, and the like. The mixing of return signals, i.e., multiplexing, is more easily accomplished with individual light sources in the geophone than with a single continuous source from a seismic vehicle passed through an outgoing optical fiber. Since the signal returns through an optical fiber, it is not distorted by AC power interference. Alternatively, the optical signal can be received on the opposite side of the baffle through the slit by a suitable photodiode which will convert the light to a binary electrical signal. This electric signal drives an LED for injecting light back into a fiber in an on/off fashion, i.e., the pulses of electricity from the photodiode would be used to drive an LED to create pulses of light for return to the seismic vehicle through an optical fiber.

FIG. 4 illustrates an embodiment of the present invention using a plurality of geophones (12A, 12B, and 12C) and an optical amplifier (60). The means for transmitting an electrical signal (24) is connected to the geophones, wherein each light source within each geophone operates at a different frequency. All of the resulting binary light signals are returned along the same optical fiber 28. The binary light signals are enhanced in optical amplifier 60.

FIG. 5 illustrates still another embodiment of the present invention. The binary light signal created in signbit geophone 12 travels through optical fiber 28 to impinge on photodiode 70, which creates a binary electrical signal, which in turn drives a second light source 80 to create a second binary light signal, which is transmitted to the seismic vehicle via the second optical fiber 90.

Having described the invention with reference to particularly preferred embodiments thereof, it should be understood that modifications that would be obvious to one of ordinary skill in the seismic arts are contemplated to be within the scope of the invention.

What is clamed is:

1. An optical-electrical geophone comprising:
   electrical means for transmitting an electrical signal to a geophone case;
   light source means connected to said means for transmitting an electrical signal in said geophone case;
   light chopping means located within said case, said light chopping means containing a passage therethrough for the transmission of light from said light source means;
   oscillating means connected to said chopping means, said oscillating means capable of oscillating said chopping means in response to geological movement so as to create a light/no-light binary signal; and
   optical fiber signal return directing means for returning the light/no-light binary signal to a seismic vehicle.

2. The apparatus according to claim 1 wherein said chopping means is a tubular member, wherein said passage therethrough for the transmission of light is formed by two slits in the same plane.

3. The apparatus according to claim 1 wherein said chopping means is a baffle, wherein said passage therethrough for the transmission of light is formed by a slit.

4. The apparatus according to claim 3 wherein the chopping means further contains focusing means located between the light source means and the optical fiber signal return directing means for increasing the angle of acceptance of the optical fiber for return signals.

5. The apparatus according to claim 4 wherein the light source is an LED.

6. The apparatus according to claim 5 wherein said chopping means includes a means for dampening the oscillations of said light chopping means.

7. The geophone according to claim 6 further comprising optical amplifiers to enhance the binary signal.

8. The apparatus according to claim 7 wherein the light source is located within said passage in the chopping means.

9. The apparatus according to claim 7 wherein the light/no-light binary signal impinges on a photodiode and creates a binary electrical signal which drives a second light source to create a second binary light signal to the seismic vehicle.

10. The apparatus according to claim 9 wherein said light source is located within said passage in the chopping means.

11. The apparatus according to claim 7 wherein the means for transmitting an electrical signal is connected to a plurality of geophones wherein each light source within each geophone operates at a different wavelength and all of said different binary light signals are returned to a seismic vehicle along the same optical fiber.

12. A process of generating a binary signal representative of the movement of a geological formation comprising:
    directing a continuous electrical signal towards a geophone;
    converting said electrical signal to a light signal in said geophone;
    chopping the light signal in said geophone in response to geological movement to form a binary chopped light signal; and
    directing said binary chopped light signal back to a seismic vehicle through an optical fiber.

13. The process according to claim 12 further comprising amplifying the light signal after chopping.

14. The process according to claim 13 wherein said continuous electrical signal is directed to a plurality of geophones generating light signals of different wavelengths and said chopped light of different wavelengths is directed to said seismic vehicle along the same optical fiber.

15. the process according to claim 13 further comprising converting said binary chopped light signal into a binary electrical signal and converting said binary electrical signal into a second binary chopped light signal.

* * * * *